(12) United States Patent
Kolar et al.

(10) Patent No.: US 11,528,218 B2
(45) Date of Patent: Dec. 13, 2022

(54) PROBE FUSION FOR APPLICATION-DRIVEN ROUTING

(71) Applicant: Cisco Technology, Inc., San Jose, CA (US)

(72) Inventors: Vinay Kumar Kolar, San Jose, CA (US); Jean-Philippe Vasseur, Saint Martin d'Uriage (FR); Grégory Mermoud, Venthône (CH); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 101 days.

(21) Appl. No.: 17/188,287

(22) Filed: Mar. 1, 2021

(65) Prior Publication Data

US 2022/0278922 A1 Sep. 1, 2022

(51) Int. Cl.
*H04L 45/125* (2022.01)
*H04L 43/12* (2022.01)
*H04L 43/0882* (2022.01)
*H04L 43/50* (2022.01)
*H04L 67/02* (2022.01)

(52) U.S. Cl.
CPC ........ *H04L 45/125* (2013.01); *H04L 43/0882* (2013.01); *H04L 43/12* (2013.01); *H04L 43/50* (2013.01); *H04L 67/02* (2013.01)

(58) Field of Classification Search
CPC ... H04L 45/125; H04L 43/0882; H04L 43/12; H04L 43/50; H04L 67/02
See application file for complete search history.

(56) References Cited

U.S. PATENT DOCUMENTS

| | | | |
|---|---|---|---|
| 9,397,920 B2 | 7/2016 | Xiao et al. | |
| 10,003,473 B2 | 6/2018 | Vasseur et al. | |
| 10,389,613 B2 | 8/2019 | Dasgupta et al. | |
| 10,904,095 B2 | 1/2021 | Karacali-Akyamac et al. | |
| 10,904,125 B2 | 1/2021 | Kolar et al. | |
| 10,979,335 B2 * | 4/2021 | Li | H04L 43/0829 |
| 11,388,073 B1 * | 7/2022 | Chraim | H04L 43/0882 |

(Continued)

OTHER PUBLICATIONS

Katz, et al., "Bidirectional Forwarding Detection (BFD)", Internet Engineering Task Force, Request for Comments 5880, Jun. 2010, 49 pages, IETF Trust.

*Primary Examiner* — Benjamin M Thieu
(74) *Attorney, Agent, or Firm* — Behmke Innovation Group LLC; Kenneth J. Heywood; Jonathon P. Western

(57) ABSTRACT

In one embodiment, a device identifies a set of probes configured between a first endpoint and a second endpoint serving an online application. Each probe has one or more characteristics and is associated with a different segment between the endpoints. The device selects a subset of the set whose associated segments are along a plurality of paths between the endpoints, based on a match between the online application and the one or more characteristics of probes in the set of probes. The device approximates a performance metric for each of the plurality of paths by aggregating performance metrics measured by probes in the subset of probes that are associated with segments of that path. The device causes traffic to be routed between the endpoints via a particular path in the plurality of paths, based on the performance metric of the particular path.

20 Claims, 13 Drawing Sheets

(56) References Cited

U.S. PATENT DOCUMENTS

| | | | |
|---|---|---|---|
| 2009/0080336 A1* | 3/2009 | Zhang | H04L 43/00 370/248 |
| 2014/0092736 A1* | 4/2014 | Baillargeon | H04L 43/50 370/252 |
| 2016/0173357 A1 | 6/2016 | Stokking et al. | |
| 2017/0077043 A1* | 3/2017 | Takemura | C25D 7/123 |
| 2020/0021493 A1* | 1/2020 | Karacali-Akyamac | H04L 43/087 |
| 2022/0166663 A1* | 5/2022 | Banka | H04W 28/0268 |

* cited by examiner

PROBE FUSION FOR APPLICATION-DRIVEN ROUTING

TECHNICAL FIELD

The present disclosure relates generally to computer networks, and, more particularly, to probe fusion for application-driven routing.

BACKGROUND

Applications are increasingly adopting the software-as-a-service (SaaS) model in which the application is hosted centrally, such as in the cloud. In these instances, application experience is often affected by the path on which the packets are routed. Accordingly, an objective of effective routing is to find a path that provides good quality of service (QoS) metrics for the application. Typically, QoS metrics are obtained in existing networks by sending probes between their routers Or application servers, to estimate the QoS metrics of the path. Alternatively, third-party probes are used that are measured from well-known locations public clouds or well-placed data centers across the world).

There are multiple challenges in approximating the actual QoS metrics experienced by the application based on the QoS metrics from the probes. First, the probes may be measured only over a part of the entire path between the endpoints. Second, probes often take the form of small ping packets, while the application may send much larger packets. Third, the probes may be measured and aggregated at different time intervals. Hence, there are multiple probes measured along multiple endpoints on the Internet using multiple protocols and periodicities. Consequently, there can be discrepancies between the actual QoS for an online application and its estimate QoS from probing.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
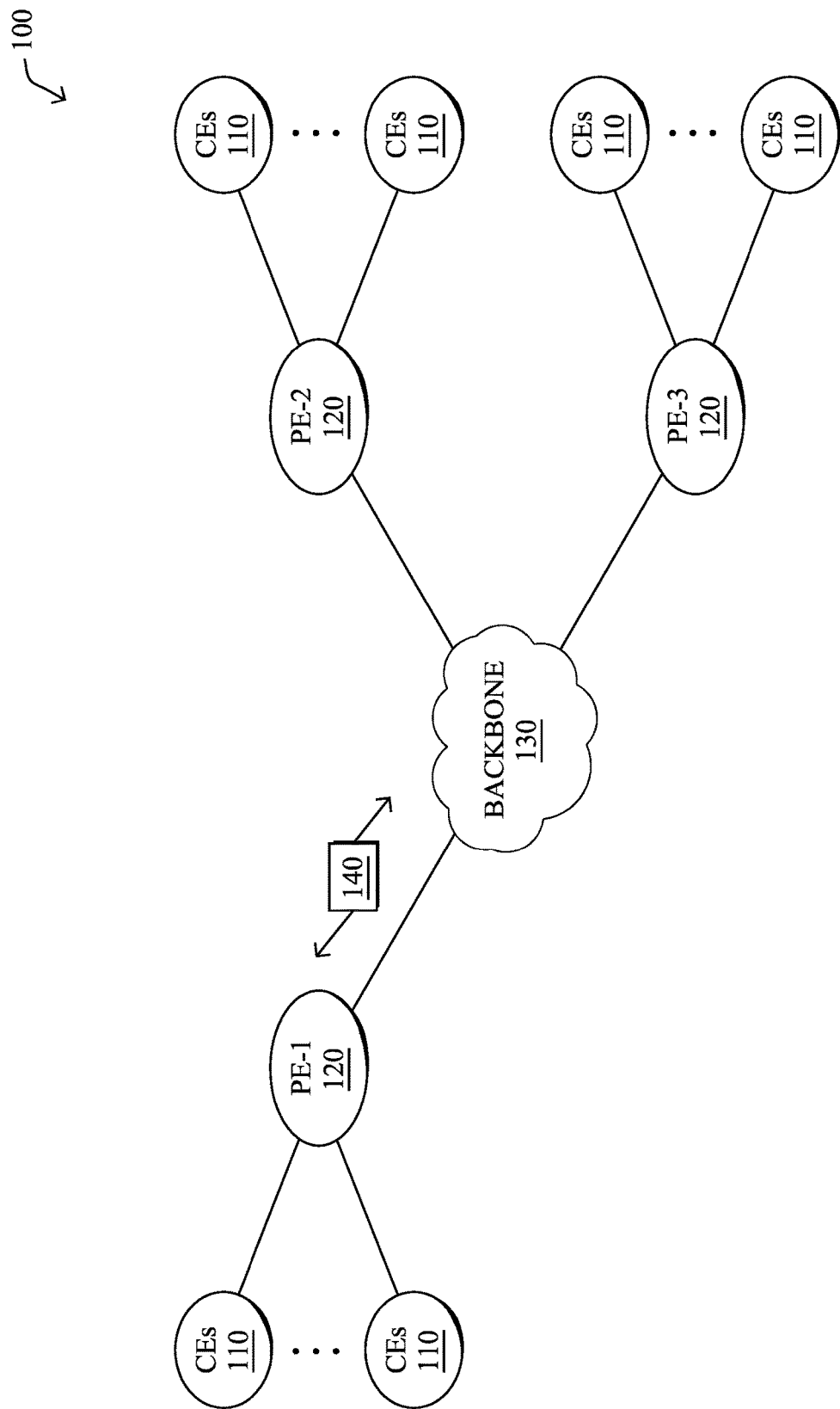
FIGS. 1A-1B illustrate an example communication network.

According to one or more embodiments of the disclosure, a device identifies a set of probes configured between a first endpoint and a second endpoint in a network, the second endpoint serving an online application. Each probe in the set of probes has one or more characteristics and is associated with a different segment between the first endpoint and the second endpoint. The device selects a subset of the set of probes whose associated segments are along a plurality of paths between the first endpoint and the second endpoint, based on a match between the online application and the one or more characteristics of probes in the set of probes. The device approximates a performance metric for each of the plurality of paths by aggregating performance metrics measured by probes in the subset of probes that are associated with segments of that path. The device causes traffic to be routed between the first endpoint and the second endpoint via a particular path in the plurality of paths, based on the performance metric of the particular path.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
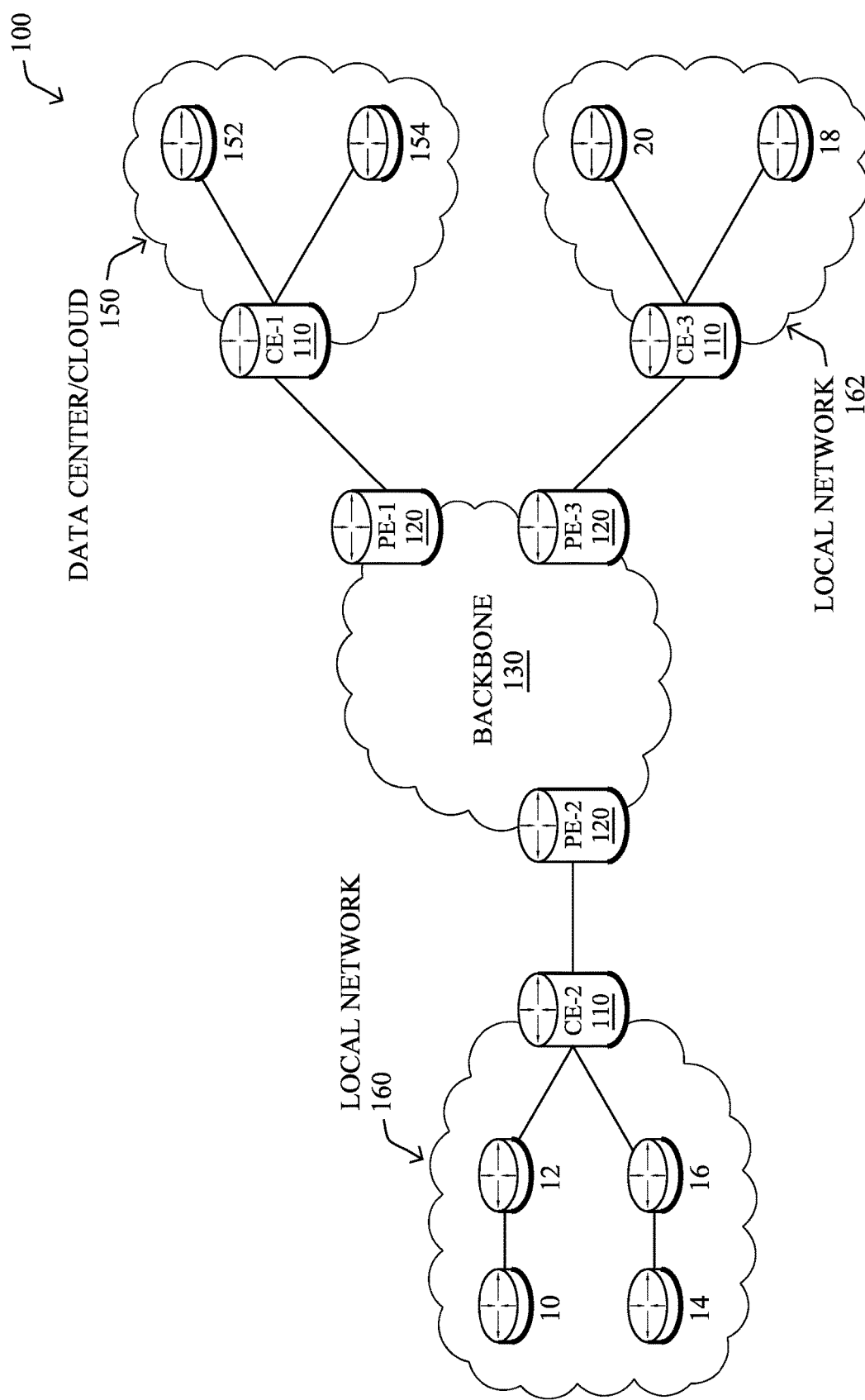

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
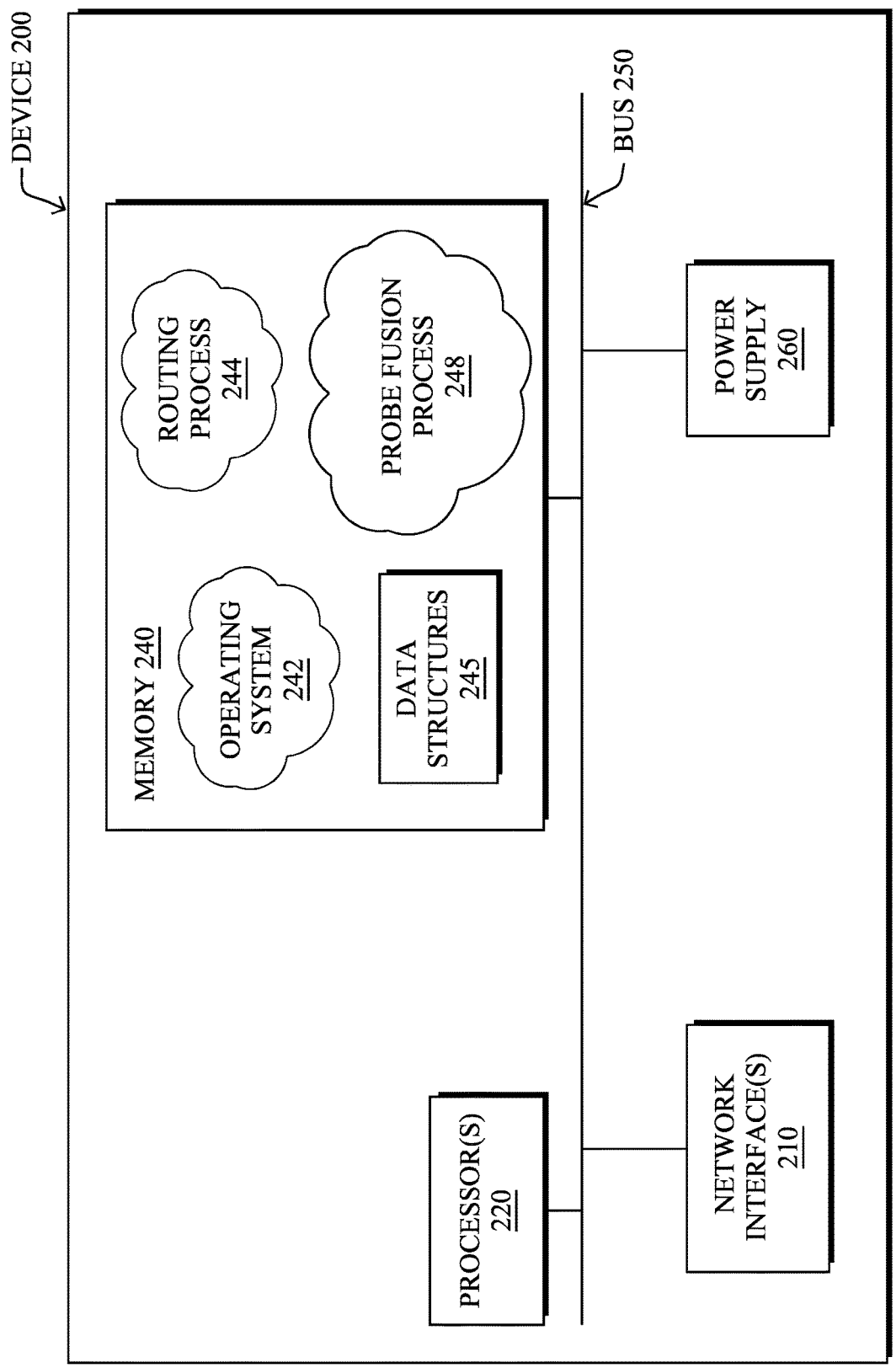
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 244 and/or a probe fusion process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process (services) 244 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, routing process 244 and/or probe fusion process 248 may also include computer executable instructions that, when executed by processor(s) 220, cause device 200 to perform the techniques described herein. To do so, in some embodiments, routing process 244 and/or probe fusion process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, routing process 244 and/or SaaS instance selection process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that routing process 244 and/or probe fusion process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
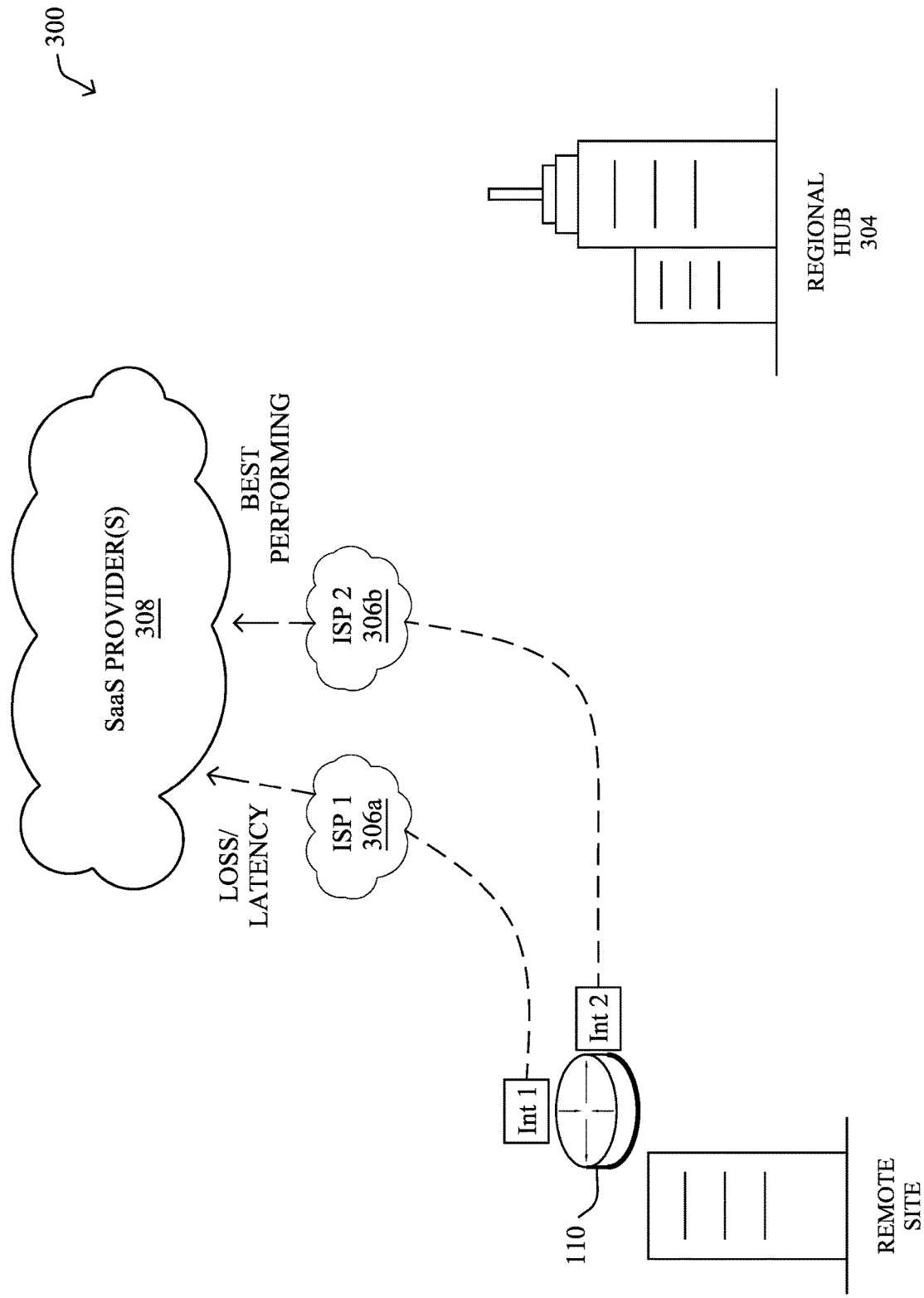
FIGS. 3A-3B illustrate example network deployments.
Figure 3B:
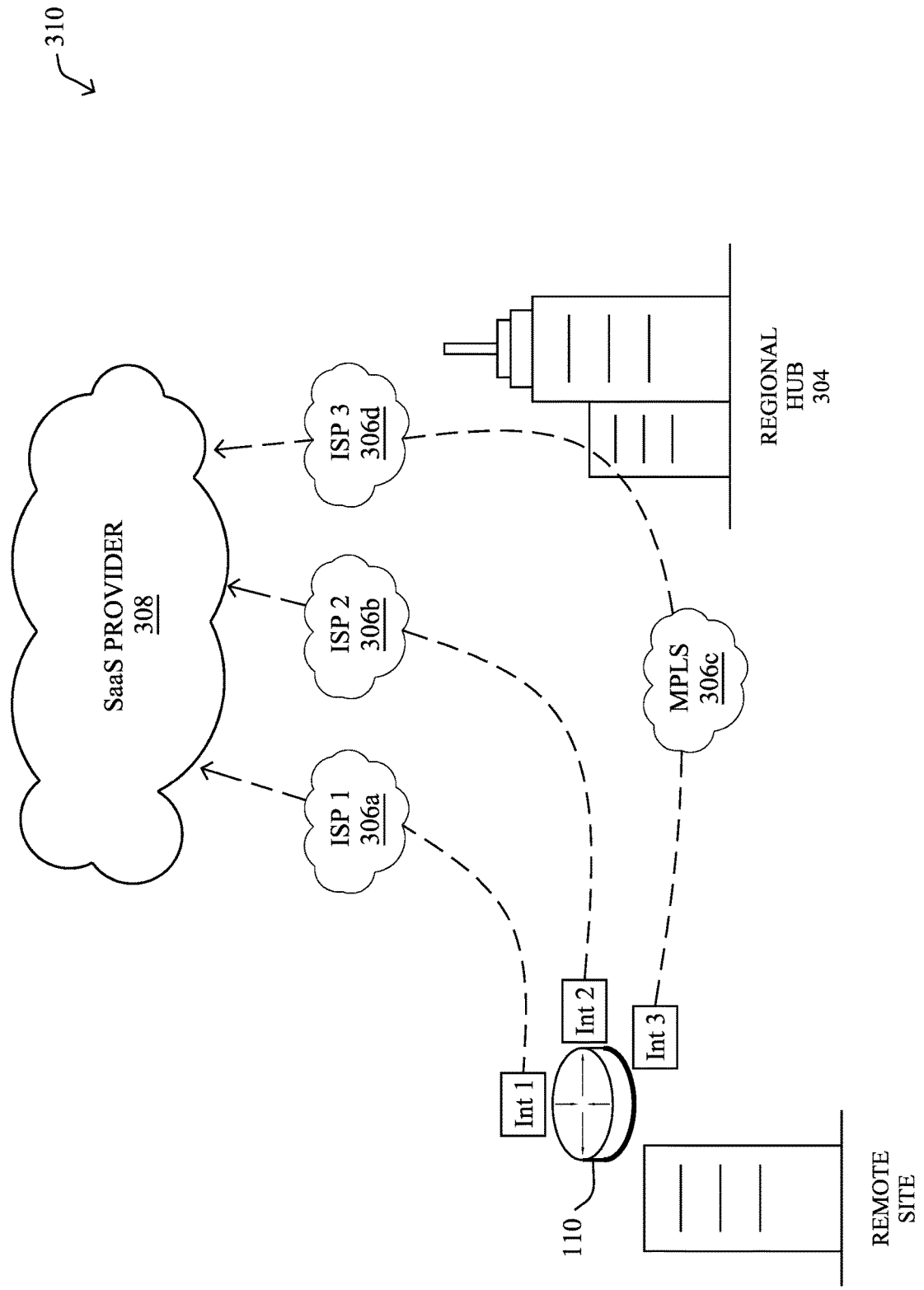

FIGS. 3A-3B illustrate example network deployments 300, 310, respectively. As shown, a router 110 (e.g., a device 200) located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider (s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
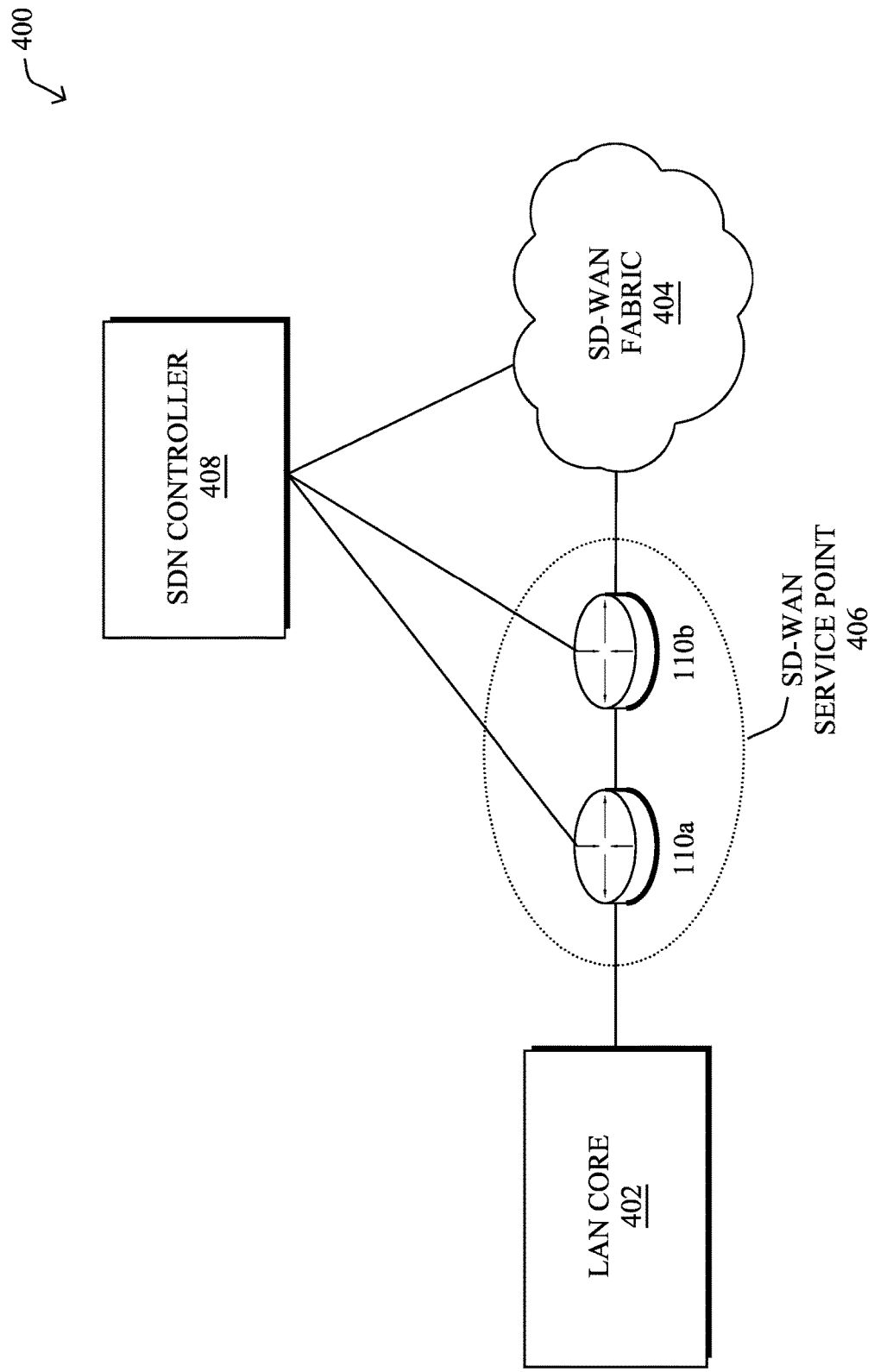
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., devices 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (IMP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of could be avoided (e.g., using an alternate path), if predicted in advance.

Figure 4B:
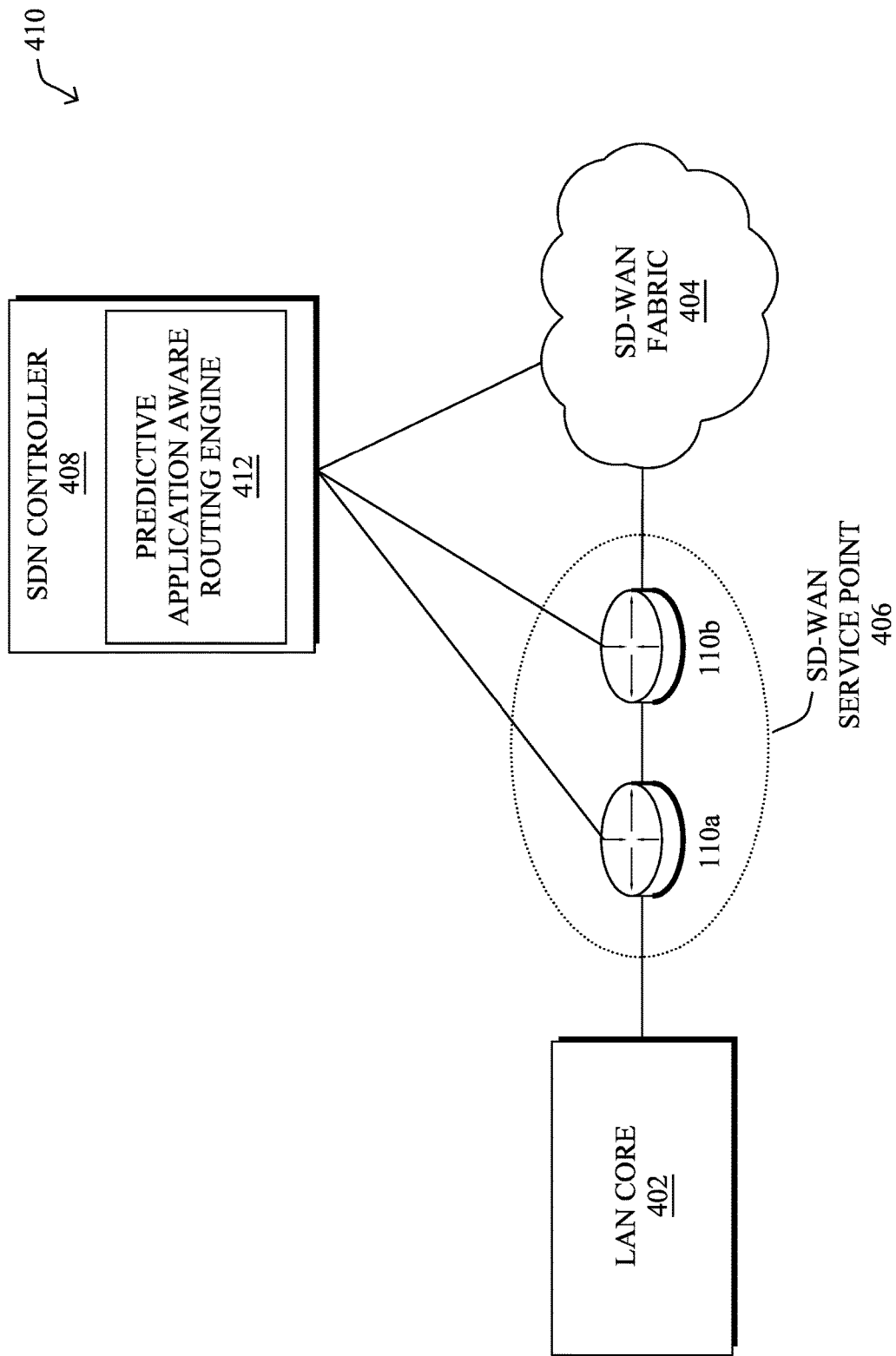

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of routing process 244 and/or probe fusion process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment.

As noted above, an objective of effective routing is to find a path that provides good QoS metrics (e.g., latency, loss, jitter, bandwidth, etc.) for the application. Existing networks often run probes between their routers or application servers to estimate the QoS metrics of the path. Alternatively, the network may rely on third-party probes which are measured from well-known locations (e.g., public clouds or well-placed data centers across the world). In either case, the QoS metrics from the probing can be used to control how the traffic for different applications are routed in the network.

There are multiple challenges in approximating the actual QoS metrics experienced by the application based on the QoS metrics from the probes. First, the probes may be measured only over a part of the entire path between the endpoints. For example, SD-WAN Bidirectional Forwarding Detection (BFD) probes measure the QoS metrics only between the tunnel endpoints (e.g., edge routers) and not the end-to-end path between the end-host and the application. Hence, the measured metrics may only represent a lower-bound. Second, probes often take the form of small ping packets, while the application may send much larger packets. As would be appreciated, the QoS metrics for different sized packets vary and, as a result, these measurements may also not represent the actual QoS for the application. Third, the probes may be measured and aggregated at different time intervals. Hence, there are multiple probes measured along multiple endpoints on the Internet using multiple protocols and periodicities. Consequently, there can be discrepancies between the actual QoS for an online application and its estimated QoS from probing. To date, however, there are no intelligent approaches to conducting probing or analyzing probing results that better reflect the actual QoS for the application.

Probe Fusion for Application-Driven Routing

The techniques introduced herein disclose systems and methods that enable the fusing the probes measured across different endpoints using different protocols and/or at different periodicities, to better determine the actual QoS impact on an application. From this, the optimal path can be selected on which the traffic of the application may be routed. In various aspects, the techniques herein provide an end-to-end system to collect, catalog, select, fuse, and maintain various types of probes for application driven routing (e.g., network routing that takes into consideration the needs of the application itself).

Illustratively, the techniques described herein may be performed by hardware, software, and/or firmware, such as in accordance with probe fusion process 248, which may include computer executable instructions executed by the processor 220 (or independent processor of interfaces 210) to perform functions relating to the techniques described herein (e.g., in conjunction with routing process 244).

Specifically, a device identifies a set of probes configured between a first endpoint and a second endpoint in a network, the second endpoint serving an online is application. Each probe in the set of probes has one or more characteristics and is associated with a different segment between the first endpoint and the second endpoint. The device selects a subset of the set of probes whose associated segments are along a plurality of paths between the first endpoint and the second endpoint, based on a match between the online application and the one or more characteristics of probes in the set of probes. The device approximates a performance metric for each of the plurality of paths by aggregating performance metrics measured by probes in the subset of probes that are associated with segments of that path. The device causes traffic to be routed between the first endpoint and the second endpoint via a particular path in the plurality of paths, based on the performance metric of the particular path.

Figure 5:
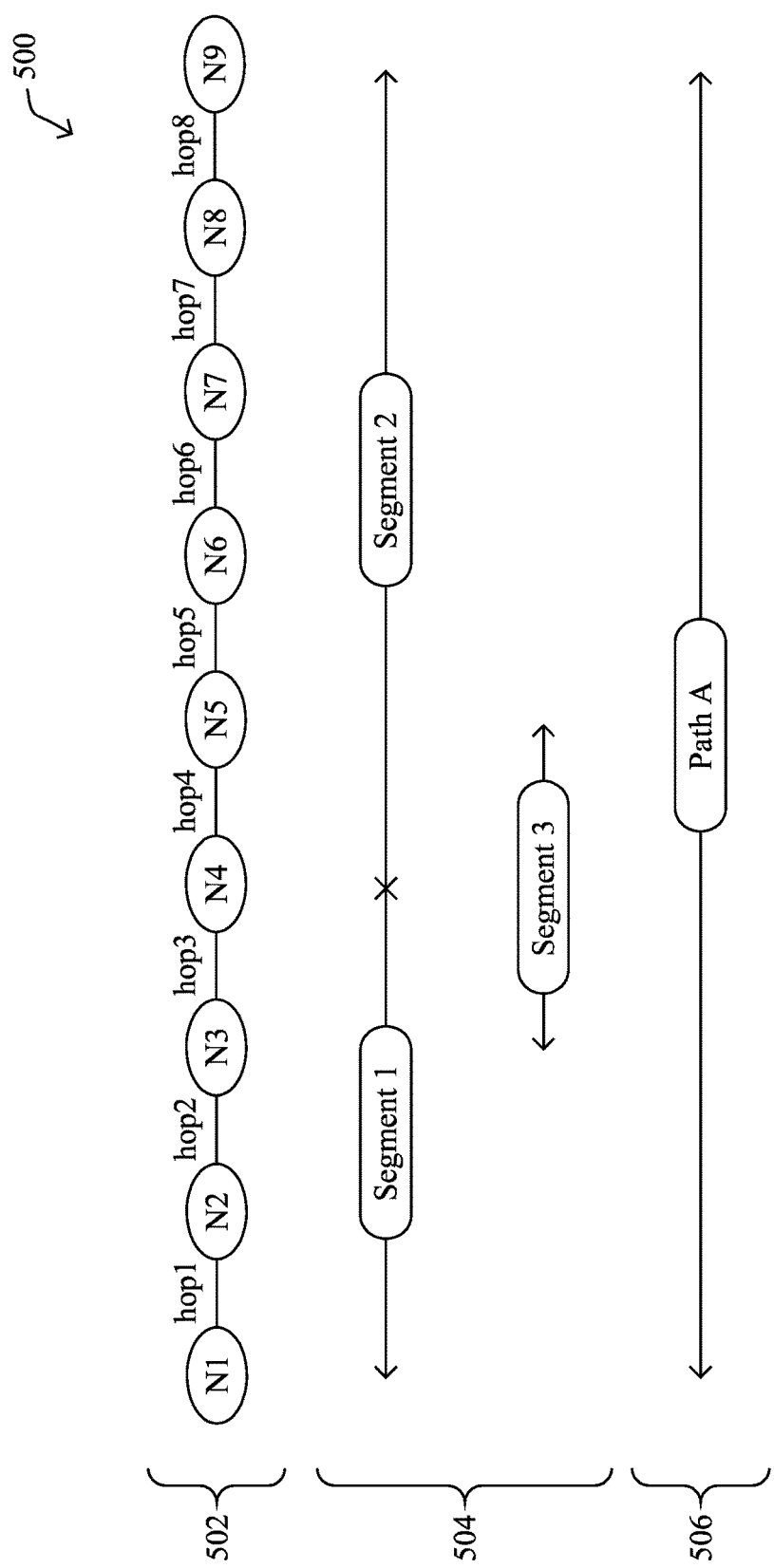
FIG. 5 illustrates an example of a network path between endpoints.

Operationally, the techniques herein may be better understood in the context of a typical network path. FIG. 5 illustrates an example 500 of such a path, in various embodiments. In general, a network path, such as network path 506 (e.g., a path 'A') may abstracted as comprising multiple nodes, hops and segments. These abstractions may be described as follows:

Node: A node is any network device. It can be an endpoint, a router, a virtual machine on the cloud application (SaaS), or the like. Nodes are either sources or destinations of traffic or are intermediate routing devices such as routers, gateways, etc. Nodes usually have one or more interfaces through which the network packets are transmitted or received. For instance, there may be different nodes 502 located along path 506, denoted N1-N9 in FIG. 5.

Hop: A hop is a direct path between a pair of nodes. In FIG. 5, for instance, hop1 may represent the direct path/connection between nodes N1-N2, hop2 may represent the direct path/connection between nodes N2-N3, etc. Note that some of the hops may be hidden and probably cannot be reached directly from the source. For example, an Autonomous System (AS) may expose only the edge-routers, and all the intermediate nodes connecting the edge-routers within a AS may not be exposed.

Segment: A segment is a part of the end-to-end path. For instance, there may be various segments 504 of path 506, such as Segment 1 (e.g., spanning from N1-N4), Segment 2 (e.g., spanning from N4-N9), and Segment 3 (e.g., spanning from N3-N5), shown. Segments may be overlapping (e.g., Segment 1 and Segment 3). Or they may be non-overlapping (e.g., Segment 1 and Segment 2). Note that there can also be multiple segments, which when stitched together, may form the entire path. For example, Segment 1 and Segment 2 are two non-overlapping segments which forms an entire path 506.

Path: A path is between a source node and given destination node. In FIG. 5, path 506 represents one such path. In some cases, a path may be between the end-devices, such as an end-to-end path between a laptop and an Office 365 application server. A path may also be established while tunneling. For example, a path can be between two edge-routers in an SDN, such as an SD-WAN tunnel.

Figure 6:
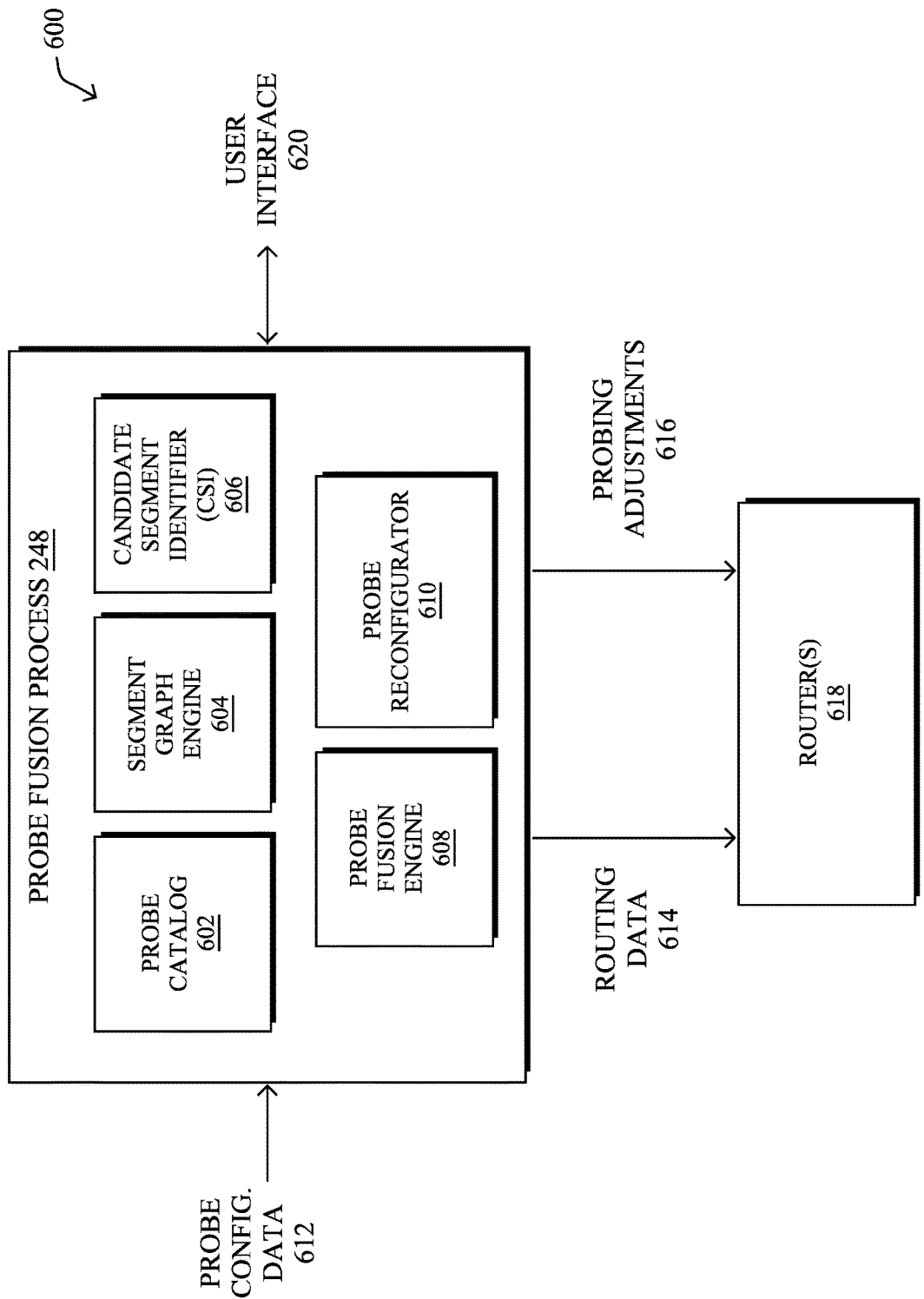
FIG. 6 illustrates an example architecture for fusing probes for application-driven routing.

FIG. 6 illustrates an example architecture for fusing probes for application-driven routing, according to various embodiments. At the core of architecture 600 is probe fusion process 248, which may be executed by a supervisory device of a network or another device in communication therewith. For instance, probe fusion process 248 may be executed by an SDN controller (e.g., SDN controller 408 in FIG. 4), a particular networking device in the network (e.g., a router, etc.), an endpoint (e.g., a client endpoint 504 or an SaaS endpoint), or another device in communication therewith.

As shown, probe fusion process 248 may include any or all of the following components: a probe catalog 602, a segment graph engine 604, a candidate segment identifier (CSI) 606, a probe fusion engine 608, and/or a probe reconfigurator 610. As would be appreciated, the functionalities of these components may be combined or omitted, as desired. In addition, these components may be implemented on a singular device or in a distributed manner, in which case the combination of executing devices can be viewed as their own singular device for purposes of executing probe fusion process 248.

In various embodiments, probe fusion process 248 may include probe catalog 602, which is responsible for registering and maintaining information regarding all probe data that will be used by the routing system. Any new probes that will be used by the system may first be registered in probe catalog 602. For instance, probe catalog 602 may receive probe configuration data 612 via an application programming interface (API or the like).

In general, the configuration of a probe stored in probe catalog 602 may indicate the various characteristics of the probe. Examples of such probe characteristics may include, but are not limited to, the probing duration, probing protocol or type HTTP ping, BFD probe, etc.), probe packet size, probing interval, how the probe is aggregated, the statistical moment used to report the KM etc. which can be registered to 602. An example probe entry in probe catalo 602 may be as follows:

Probe Type: SaaS pings
Endpoint Types:
Source:
   Source host: Edge-router
   Source Interface: Any interface
Destination: Anycast IP for SaaS
Probe Protocol: https pings
Probe packet train:
Num packet in one train: 10
Size of each packet: 32 bytes
Probe interval: 500 ms
Aggregation
Type: Mean
Periodicity (Sampling interval): 10 mins In another embodiment, probe catalog 602 may discover such probe configuration information from various datalakes, automatically. For instance, probe catalog 602 may spawn processes that scan different authorized datalakes and discover probes used across the network. For example, the user may indicate the table names of probes, and the process can first discover well-known column types such as IP fields, end-host names, loss, latency, and throughput columns. With little guidance from the user (e.g., identifying columns that represent the two endpoint) the process can automatically discover the periodicity of probes. In turn, probe catalog 602 may request that the user supply any missing metadata for the probes. In yet another embodiment, probe catalog 602 may obtain probe configuration data 612 by sending a custom request message to another system, thereby allowing probe catalog 602 to poll the probes available.

Typically, the probe configuration data 612 may be stored in probe catalog 602 as a common datalake and using a normalized Common Data Model (CDM). For instance, any CDM that has standardized column names for endpoints, QoS metric name, QoS metric value, etc. would suffice for purposes of probe fusion. All the data across relevant probes can be ingested into a single datalake in a CDM format. This forms the datalake of probe catalog 602. An example CDM format used in a prototype of probe catalog 602 is shown below:

Schema:
- endpointID (string, mandatory): Unique ID for the endpoint.
- endpointType (string, mandatory): type of the endpoint, which may be any of the following:
  - Edge Router: used for vEdge/cEdge routers, the most common type of endpoints
  - Core Router: used for core routers that route traffic in service provider (SP) backbones
  - Controller: used to represent control elements of the network infrastructure
  - Public Endpoint: an application endpoint or proxy that is routable over the public Internet.
  - Private Endpoint: an application endpoint or proxy that is only accessible from within a private network.
  - Unknown: an unknown endpoint
- Location: location information about the endpoint:
  - latitude (float)
  - longitude (float)
  - country (string)
  - city (string): the nearest city
  - region (string): Level-1 admin. division, including the city.
- metadata (object): free-form metadata about the endpoint, which may include:
  - systemIp (string): for edge routers, the system IP address of the router
  - hostname (string): for most endpoints, the hostname, when known
  - siteID (string): the site identifier for the endpoint
- aggregatedBy (string): when set, indicates the aggregation granularity (e.g., location.city)

Another potential component of probe fusion process 248 may be segment graph engine 604, which is responsible for maintaining a graph of connections represented in the datalake of probe catalog 602. Probe catalog 602 may also provide the endpoints, QoS metrics, and the probe metadata to segment graph engine 604. In turn, 604 may break down this information into segments, represented as a graph that segment graph engine 604 may store with proper indexing (e.g., within probe catalog 602 or elsewhere). Such a graph representation is useful for querying to fuse required probes while constructing an end-to-end route.

In one implementation, all the endpoints represent the nodes of the segment graph, and each probe available between the two endpoints, is represented as an edge. Note that there may be multiple probes between same endpoints. For example, Viptela SD-WAN constructs BFD probes to measure tunnel health between two <edge-router, interface> combination. Additional probes may also run between same <edge-router, interface> combination. For example, a path-trace probe may also measure loss, latency and jitter. In this case, the tunnel will be one edge, and there will be an edge for the path-trace probe. Due to this requirement, the resulting graph constructed may be a multi-graph (e.g., a graph with many parallel edges between the endpoints).

Figure 7:
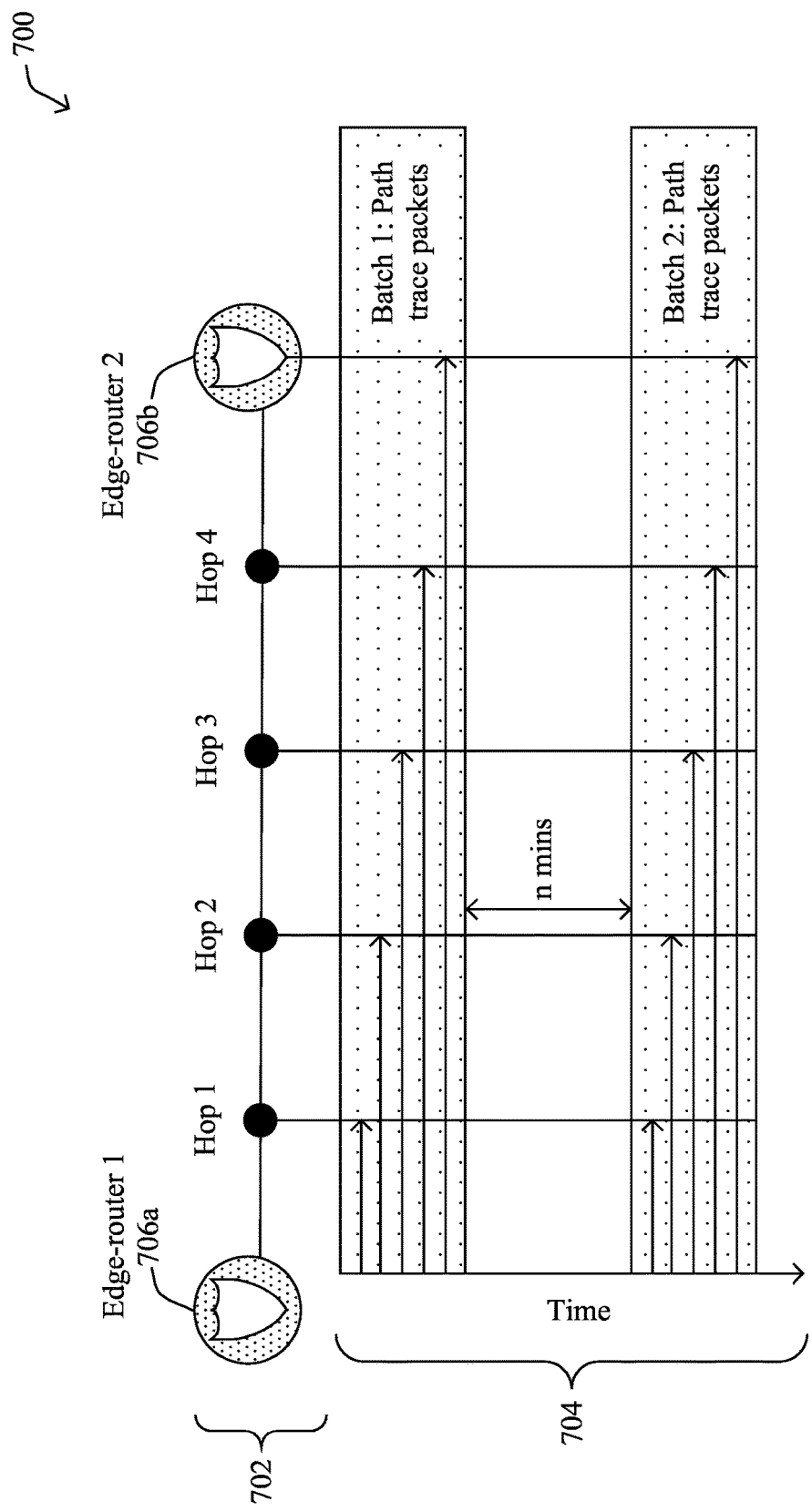
FIG. 7 illustrates an example of the probing of a path between endpoints.

As would be appreciated, path-trace probes measure not only end-to-end metrics between the endpoints, but also the intermediate hops. For instance, FIG. 7 illustrates an example 700 of the end-to-end probing of a path. As shown, assume that path 702 comprises a plurality of hops between two edge routers 706a, 706b. To probe path 702, edge router 706a may send path-trace probes 704 to every detectable hop along path 702, and measures metrics such as the round trip time (RTT), packet loss, etc., to every hop. Typically, this is done in batches, periodically. For instance, edge router 706a may send batches of path-trace packets 704 every n-number of minutes. Hence, probes 704 will obtain information about multiple segments which will be represented in the segment graph: EdgeRouter1-Hop1, EdgeRouter1-Hop2, . . . , EdgeRouter1-EdgeRouter2.

Referring again to FIG. 6, segment graph engine 604 may also tag each edge in the segment graph with the probe types and/or other metadata about the probe. Note that the graph may also be time-dependent, since metrics vary over time. To this end, segment graph engine 604 may leverage appropriate data structures and indexing, to represent such a time-dependent multi-graph.

Segment graph engine 604 may also be responsible for ensuring that the segment graph is kept up-to-date over time. This may entail, for instance, segment graph engine 604 performing functions such as adding new edges and pruning edges when their associated probes are not active anymore (e.g., as indicated by probe configuration data 612). In some embodiments, segment graph engine 604 may also provide information about the segment graph to a user interface 620, thereby allowing a network administrator to review the graph and/or make edits to the graph.

According to various embodiments, probe fusion process 248 may also include CSI 606, which is responsible for finding all relevant candidate segments for which the probes can be fused to access possible QoS on for the application traffic. Probe fusion engine 608, described in greater detail below, will query CSI 606 to provide all paths and probes that can be used along the paths between a pair of endpoints for a particular application (e.g., a voice application, etc.). An example query will specify the properties of the probes that are required for routing that type of application traffic. An example query is shown below:

Query:
  Endpoints:
    Source:
      Source host: Public-IP1
      Source interface: Any interface
    Destination:
      Office 365 SaaS endpoint
    Application type:
      Voice call
    Constraint:
      Probe interval: <1000 ms
      Aggregation of probe: Any
      Protocol: Any
      Probe packet size: <64 bytes In turn, CSI 606 may issue a response that indicates a set of probes (edges of the segment graph) that satisfy the above query, and may form segments of the path between the endpoints. For instance, an example response may be as follows:

Response:
Path 1:
   Segment 1: <IP1, IP2, Probe id>
   Segment 2: <IP2, IP3, Probe id>
   . . .
Path 2:
   Segment 1: <IP1, IP4, Probe id>
   Segment 2: <IP4, IP5, Probe id>
   . . .
. . .
Path n:
   . . .

According to various embodiments, the main task of CSI 606 is to find all feasible sets of paths and their segments between the endpoints. In one embodiment, CSI 606 may first filter out segments and their associated probes, to keep only the feasible segments (e.g., probes that match the application and probe constraints as specified in the query). CSI 606 may then run Dijikstra's algorithm to find the shortest path between the endpoints, CSI 606 may also consider the weight of the edge with respect to one or more QoS metrics (e.g., latency, etc.). In turn, CSI 606 may then provide all of the segments and their probes in the shortest path as the query results.

For time-varying segment graphs, CSI 606 may leverage a modified form of Dijikstra's algorithm that considers the shortest path (according to some QoS metric at the given time-of-the-day. This this can be done, for instance, in a naïve way by summarizing probe QoS metrics for a period of time, such as every hour-of-the-day, day-of-the-week, or the like. Note that finding one shortest path requires precise reliance on one QoS metric (e.g., latency, packet loss, etc.), and that it can be added over the segments. For example, latency will usually meet this condition, but loss does not since if loss is x % over segment 1 and y % over segment 2, then loss over combined Segment1-Segment2 is at least, max(x, y) % and at most (x+y) % but those bounds will usually differ. Hence, CSI 606 may compute a relaxed set of feasible shortest paths, in this instance. The actual refinement and selection of the best path for routing the application traffic will be performed by probe fusion engine 608.

In a second embodiment, CSI 606 may identify all feasible paths between source and destination endpoints, which will address the limitation of not relying strictly on the one QoS metric. This can be achieved via the A*-routing algorithm which not only finds the shortest path, but also a nearby (tree) of paths between the endpoints. Such algorithms are often used for path planning in transportation networks. In other cases, 606 may leverage other path finding algorithms between the endpoints, as desired.

In a further embodiment, CSI 606 does not use a perfect graph routing algorithm like before, but may instead use an algorithm to identify all of the segments that may lie on some path between the endpoints. Note that there may be some segments that have edges between them, since there is no probe that measures such missing segments. For example, consider the path EP1-AS1-<?>-AS3-EP2 between endpoints EP1 and EP2 and across at least autonomous systems AS1 and AS3. There might be probes between EP1 and AS1, and a probe between AS3 and EP2. However, the intermediate path might be unknown. Such segments can be identified by looking at all possible segments seen from source EP1 and destination EP2 (e.g., EP1-AS1 and AS3-EP2).

In yet another embodiment, CSI 606 may provide multiple overlapping segments in a given path within its response. For example, in the path EP1-AS1-AS2-AS3-EP2, there might be probes between AS1-AS2 and also between EP1-AS2. Note that there may be multiple hops between AS1-AS2, as well. However, there can be one probe which measures the segment AS1-AS2. In such cases, CSI 606 may return all three probes as associated with candidate segments in its query response.

As would be appreciated, an endpoint may not be a physical IP address, in many cases. For instance, an endpoint may be a SaaS application that can be present at multiple points in the world (e.g., an Office 365 end point, another SaaS endpoint, etc.). In such a case, CSI 606 may perform a lookup of the IP address, if the source or destination is unknown, or is an anycast address. For example, for SaaS destinations, CSI 606 may look up the most probable SaaS endpoints from the source or intermediate exit routers.

A further component of probe fusion process 248 may be probe fusion engine 608, in various embodiments, which is responsible for fusing/stitching probes and their results across segments, as returned by CSI 606, and determining the best path for the application traffic. In turn, probe fusion engine 608 may configure the best routing path by pushing routing data 614 to the affected router(s) 618, either directly or indirectly (e.g., via an SDN controller, etc.). To do so, probe fusion engine 608 may first obtain information about a set of endpoints and the application whose traffic is to be routed. For instance, if probe fusion process 248 is co-hosted by an SDN controller, probe fusion engine 608 may receive this information via a query to the routing engine regarding the endpoints and applications being routed. In addition to obtaining information about the endpoints and applications, probe fusion engine 608 may also query CSI 606, to get all of the possible paths and segments between the given endpoints EP1 and EP2.

In various embodiments, probe fusion engine 608 will define and implement what are referred to herein as 'probe fusion operators.' These are operators that input two or more probes on different segments and estimate the QoS metrics on a combined segment. For example, consider two probes measure different segments of the path: BFD probes measures loss and latency the segment between two edge routers (ER1 and ER2), and SaaS HTTP probes measures loss and latency on the segment from Gateway ER2 to the SaaS application server. Since the two segments are non-overlapping and contiguous, it can be inferred that the overall latency between the ER1 to SaaS application server can be approximated as an addition of the latency observed on the segment ER1-ER2 and the latency observed on segment ER2-SaaS application server.

Figure 8A:
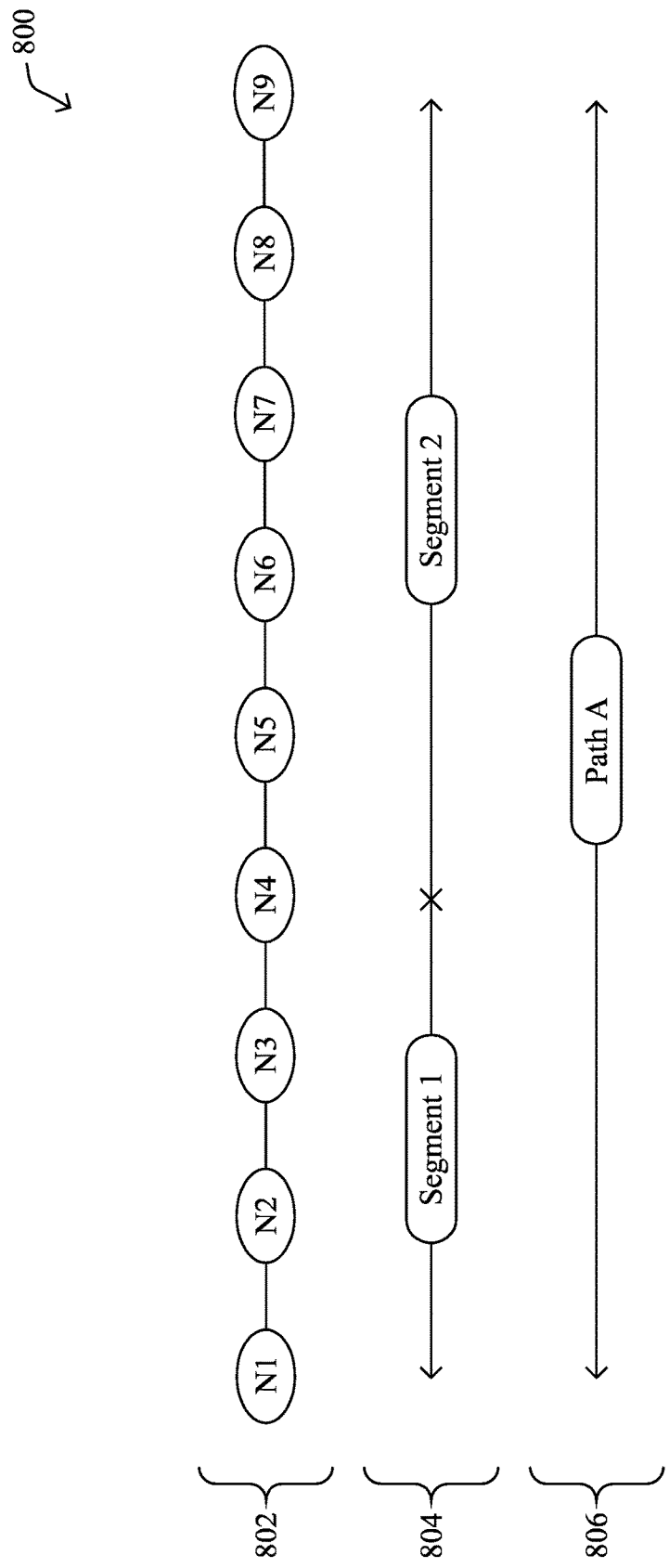
FIGS. 8A-8B illustrate examples of different path segment configurations.

Preliminary testing of a prototype system has shown that different probe fusion operators may be used, depending on the conditions of the segments under analysis. For instance, if the segments measured by the probe are disjoint, i.e., there is some part of the path that is unmeasured, then the addition of latencies will not provide a good approximate of the overall path latency. Hence, in order to define a probe fusion operation, a prerequisite is to define what types of segments that operator can be applied. Three examples of different segment scenarios are as follows:
   Non-overlapping Contiguous Segments
   Non-overlapping Non-Contiguous Segments
   Overlapping Segments with Same Source By way of example, consider example 800 shown in FIG. 8A. Here, we again have a path 806 that comprises a plurality of nodes 802 (e.g., nodes N1-N9) with two segments 804 for which probes are available and used: Segment 1 and Segment 2. Here, Segment 1 and Segment 2 are non-overlapping and contiguous. This is a very common situation in the case of an SaaS gateway, where N1 is an edge router, N2 is another edge router, and N9 is an SaaS application server. Under such conditions, BED probes are typically used to measure the loss and latency on Segment 1, while SaaS HTTP probes are typically used to measure the loss and latency on Segment 2.

When a path is made up of such non-overlapping contiguous segments, the KPIs latency and loss can be added up to quantify the latency and loss over the entire segment. Two examples for calculating the path QoS metrics in such a scenario are described as follows:

1. latency_add($d_{s1}, d_{s2}, \ldots, d_{sn}$): this operator takes in latency (delay) values $<d_{s1}, d_{s2}, \ldots d_{sn}>$ measured over the same period for non-overlapping, contiguous segments $<s_1, s_2, \ldots s_n>$, respectively. The output returned is the latency value of the entire path from end-to-end. The output latency of the path $d_{path}$ is simply given by:

$$d_{path} = \sum_{i=1 \ldots n} d_{si}$$

In another embodiment, the distribution of the latency across each segment can be considered. Let each of the latency on a segment $s_i(d_{si})$ comes from a normal distribution $d_{si} \sim N(\Sigma \mu_{si}, \Sigma \sigma_{si}^2)$ where $\mu_{si}$ and $\sigma_{si}^2$ are the mean and variance of the distribution. Then, the overall distribution can be shown to be the sum of normal distributions, and hence:

$$d_{path} \sim N(\Sigma \mu_{si}, \Sigma \sigma_{si}^2)$$

Such a distribution notation is useful to not only give one value of latency, but an approximate distribution of the resulting latency. Covariance terms can be added to the model if there are statistical dependencies between latencies across paths.

2. loss_add($l_{s1}, l_{s2}, \ldots, l_{sn}$): This operator takes in the loss percentage values $<l_{s1}, l_{s2}, \ldots, l_{sn}>$ measured over the same period for non-overlapping, contiguous segments $<s_1, s_2, \ldots, s_n>$, respectively. In this case, it can be assumed that the loss between the segments is independent. Therefore, the loss over the entire path $l_{path}$ is simply given by:

$$l_{path} = \prod_{i=1 \ldots n} (1 - l_{si})$$

This is because ($1-l_{s1}$) is the probability of success, and a multiplication of those across all segments will yield the probability of success for the entire path.

Similar to above, a statistical distribution of loss can be approximated for the entire segment. For example, if the success fraction for each segment $s_1$ ($1-l_{s1}$) is modelled as a beta-distribution between [0,1], then the success fraction of the path can be modelled as the product of all beta distributions.

Alternatively, a confidence interval can be obtained as follows:

$$\max(l_{si}) \leq l_{path} \leq \min(1, \Sigma l_{si})$$

When the segments of the path are non-contiguous, then approximation methods can be applied. For example, given that there are some segments missing, a lower-bound on the loss or latency can be computed. This can be performed by assuming the zero latency or loss or jitter over the missing segments, and applying the same approaches as above for non-overlapping, contiguous segments. In another embodiment, the missing segments can be replaced by suitable approximations queried from the segment graph store. For example, if the IP address of the missing segment indicate that the missing segment is between two cities, then the segment graph can be queried to get mean latency or loss between those cities.

Figure 8B:
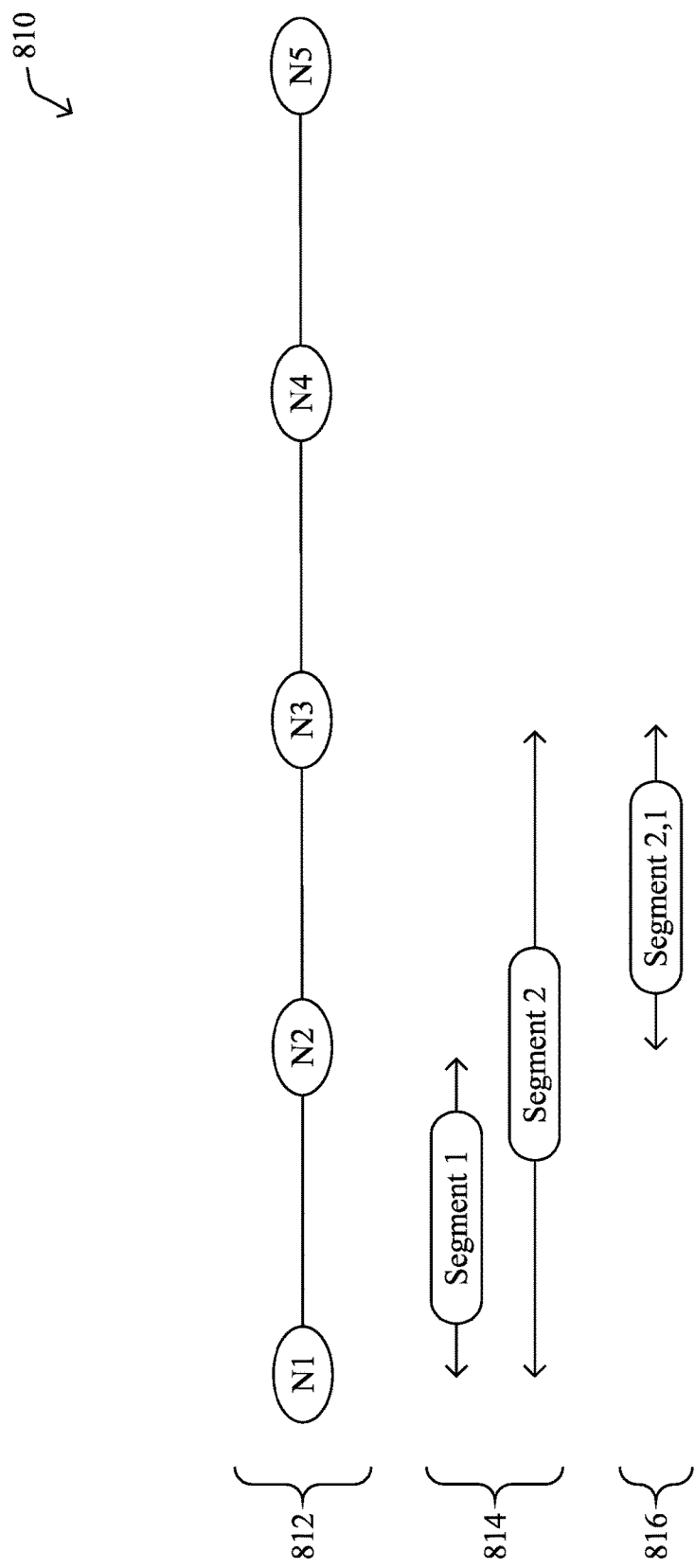

Consider now example 810 in FIG. 8B. The scenario shown is typical to the case of path-trace probing, as described previously with respect to FIG. 7. For instance, nodes 812 (e.g., N1-N5) may be such that N1 and N5 are edge routers and N1 performs path-trace probing between them. Here, the latency (or another KPI round-trip-time) of each segment from the source to each of the measurable next hops is recorded via probing. Consequently, a set of segments 814 (e.g., Segment 1, Segment 2, etc.) are associated with the different probes, with Segment 1 extending between the source node N1 and Segment 2 extending between the source node N1 and N3, etc. In this situation, in various embodiments, the latency between N2 and N3, i.e., segment 816, denoted Segment 2,1 can be estimated as the observed latency on Segment 2, minus the latency observed on Segment 1.

Note that Segment 1 and Segment 2,1 above can be considered as two non-overlapping contiguous segments, and Segment 2 can be considered as the combination of Segment 1 and Segment 2,1, Hence, most derivations can be easily derived from the equations in the above section. Accordingly, probe fusion operators for determining the latency and loss between such intermediate segments are as follows:

1. latency_subtract($d_{s2}, d_{s1}$): let the segment $s_{2,1}$ (e.g., segment N2-N3) denote the segment $s_2$ and $s_1$. Then, if the latency measured on $s_1$ and $s_2$ (at the same point in time) is $d_{s1}$ and $d_{s2}$, respectively, then the latency on $s_{2,1}(d_{2,1})$ is defined by:

$$d_{2,1} = \max(d_{s2} - d_{s1}, 0)$$

Note that the latency can never be zero if segment $s_1$ is not equal to segment $s_2$. Hence, it can be replaced by max ($d_{s2} - d_{s1}, \delta$), where $\delta$ is some reasonable lower-bound on the latency.

In another embodiment, the latency can be approximated by a reasonable standard distribution that is amenable to subtraction. For example, if latency on a segment $s_i(d_{si})$ comes from a normal distribution $d_{si} \sim N(\Sigma \mu_{si}, \Sigma \sigma_{si}^2)$ where $\mu_{si}$ and $\sigma_{si}^2$ are the mean and variance of the distribution. If $d_{s1}$ and $d_{s2}$ are independent, which is a strong assumption, then the resulting latency on the segment $d_{s2,1}$ can be shown also to be a normal distribution coming from the following distribution:

$$d_{s2,1} \sim N(\mu_{s2} - \mu_{si}, \sigma_{s2}^2 + \sigma_{s1}^2)$$

2. loss_subtract($l_{s2}, l_{s1}$): Similar to the above operator, the loss on the segment $s_{2,1}$ can also be modeled. Using the previous assumption that the losses on different parts of the path are independent, then derivation of the loss on segment $s_{2,1}$ comes directly from the below equation. Here, let $l_{s1}, l_{s2}$, and $l_{s2,1}$ be the losses at segments $s_1$, $s_2$, and $s_{2,1}$. From the above, it can be directly seen that:

$$l_{s2} = 1 - (1 - l_{s1})(1 - l_{s2,1})$$

which can be rewritten as follows:

$$l_{s2,1} = 1 - \frac{(1-l_{s2})}{(1-l_{s1})}$$

In different embodiments, the other statistical, arithmetical or machine-learning based fusion operators may be defined.

Referring again to FIG. 6, a final component of probe fusion process 248 may be probe reconfigurator 610, which is responsible for system optimization such that unnecessary probes of probes are not ingested. To do so, probe reconfigurator 610 may scan the segment graph store and recognize probes that are not too valuable for the current queries. In turn, probe reconfigurator 610 can then dynamically optimize the system. Example optimization functions may include, but are not limited to, any or all of the following:

Move inactive probes to secondary graph: probe reconfigurator 610 may keep a record of how often certain segments (probes) are being used by the system. It can then take an action to remove such probes that are less used from the primary segment graph and archive them into a secondary segment graph. By doing so, CM 606 can query the primary graph for most scenarios and only rely on the secondary graph if it does not get satisfactory query results (e.g., no probes on primary graph with given application constraints, etc.).

Disable probe ingestion: probe reconfigurator 610 may also decide to purge the probe from probe catalog 602 if it finds that the probes were not used in primary, or secondary graphs or if they are not useful for making routing decisions. In such cases, it may issue commands to the ingestion or other source, to stop ingesting the data for certain segments. For example, probe reconfigurator 610 may disable path-trace probes on local West Coast to WestCoast datacenters, and only consider Asia-EU, if routing will only help in this region.

Change frequency of probes: If some probes are being ingested at a fine granularity (e.g., aggregation period of probes is 1 minute), it imposes a heavy computational and storage requirement for such probes. In such cases, probe reconfigurator 610 may determine whether the probing frequency can be reduced. For example, probe reconfigurator 610 may check whether the latency over 10 one-minute probes is changing drastically or not. This can be done by, say, measuring the difference between original probes and the moving average of probes in 10 minutes. If the difference is considered to be minimal, probe reconfigurator 610 may then send probing adjustments 616, to reduce the frequency to, say, 10 minutes instead of one minute (or any other frequency change.

Figure 9:
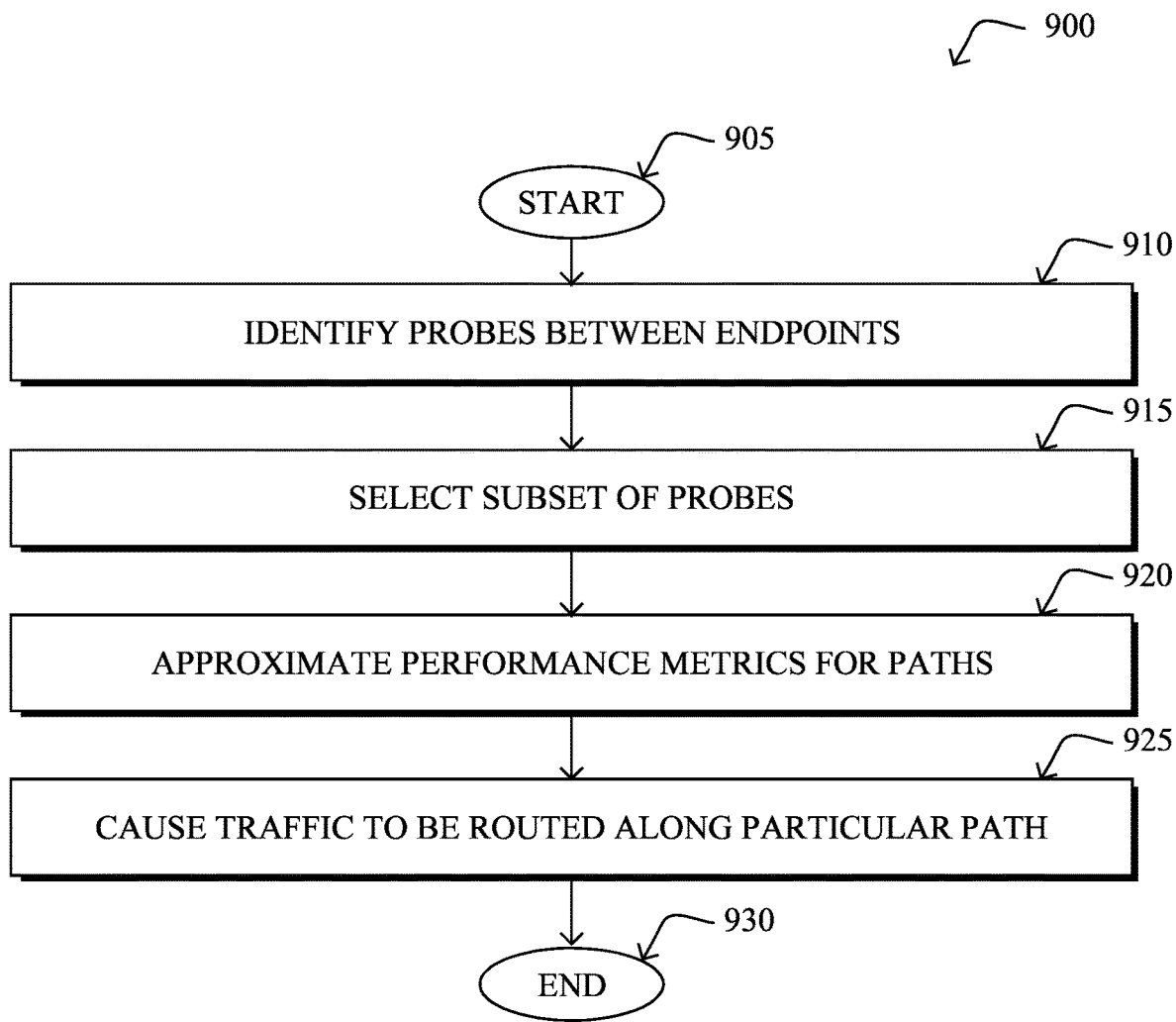
FIG. 9 illustrates an example simplified procedure for routing traffic in a network based on fused probe information.

FIG. 9 illustrates an example simplified procedure 900 for routing traffic in a network based on fused probe information, in accordance with one or more embodiments described herein. For example, a non-generic, specifically configured device (e.g., device 200), such as a networking device (e.g., a router, an SDN controller for an SD-WAN, an SaaS endpoint, an SaaS application client, etc.), or a device in communication therewith, may perform procedure 900 by executing stored instructions (e.g., probe fusion process 248 and/or routing process 244). The procedure 900 may start at step 905, and continues to step 910, where, as described in greater detail above, the device may identify a set of probes configured between a first endpoint and a second endpoint in a network. Such a network may comprise, for instance, an SDN, SD-WAN, or other network. In general, the second endpoint serves an online application. For instance, the second endpoint may be an SaaS server or other application server. In various embodiments, each probe in the set of probes has one or more characteristics and is associated with a different segment between the first endpoint and the second endpoint. For instance, the one or more characteristics comprise a packet size, probe type (e.g., HTTP probe, BDF probe, etc.).

At step 915, as detailed above, the device may select a subset of the set of probes whose associated segments are along a plurality of paths between the first endpoint and the second endpoint, based on a match between the online application and the one or more characteristics of probes in the set of probes. In other words, the device may identify the probes for feasible paths between the endpoints, such as those probes whose characteristic(s) are suitable to assess the potential performance of the application traffic along the probed segments. For instance, if a particular probe uses considerably smaller packets than that of the application traffic, the device may exclude that probe from consideration.

At step 920, the device may approximate a performance metric for each of the plurality of paths by aggregating performance metrics measured by probes in the subset of probes that are associated with segments of that path, as described in greater detail above. For instance, the device may approximate the loss, latency, jitter, or bandwidth along a path, based on the probing of its constituent segments. Note that the segments may be overlapping (e.g., with the same source), non-overlapping and contiguous, or non-overlapping and non-contiguous, in various cases. Depending on the configuration of the probes, the device may approximate the performance metric using one of the computations described previously.

At step 925, as detailed above, the device may cause traffic to be routed between the first endpoint and the second endpoint via a particular path in the plurality of paths, based on the performance metric of the particular path. As would be appreciated, the probe fusion approach herein may result in a selection of a different path than would normally be selected using direct path measurements. In doing so, the path that is likeliest to afford the best application experience can be used to convey the traffic between the two endpoints. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for advanced probe fusion techniques that allow for probing results along different segments in a network to be combined/fused for purposes of making routing decisions. In doing so, the system can better approximate the end-to-end path metrics for the available paths between endpoints, thereby providing the user of an application with a better application experience. In addition, the techniques herein also provide mechanisms for considering disparate types of probes, such as BFD probes, HTTP probes, and the like, as part of the probe fusion mechanism.

While there have been shown and described illustrative embodiments that provide for probe fusion for application-driven routing, it is to be understood that various other adaptations and modifications may be made within the spirit and scope of the embodiments herein. For example, while certain embodiments are described herein with respect to using certain computations and operators to determine path performance metrics to make routing decisions, these computations are not limited as such and can be used for other purposes, in other embodiments (e.g., strictly for reporting, etc.). In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
    identifying, by a device, a set of probes configured between a first endpoint and a second endpoint in a network, the second endpoint serving an online application, wherein each probe in the set of probes has one or more characteristics and is associated with a different segment between the first endpoint and the second endpoint;
    selecting, by the device, a subset of the set of probes whose associated segments are along a plurality of paths between the first endpoint and the second endpoint, based on a match between the online application and the one or more characteristics of probes in the set of probes;
    approximating, by the device, a performance metric for each of the plurality of paths by aggregating performance metrics measured by probes in the subset of probes that are associated with segments of that path; and
    causing, by the device, traffic to be routed between the first endpoint and the second endpoint via a particular path in the plurality of paths, based on the performance metric of the particular path.

2. The method as in claim 1, wherein the network is a software-defined network and the plurality of paths comprise network tunnels.

3. The method as in claim 1, wherein the performance metric comprises loss, latency, jitter, or bandwidth.

4. The method as in claim 1, wherein the one or more characteristics of each probe comprises a packet size, and wherein selecting the subset of the set of probes comprises:
    matching the packet size of each probe in the subset to an expected packet size of the traffic to be routed.

5. The method as in claim 1, wherein the one or more characteristics of each probe comprises a probe type, and wherein at least two of the probes associated with segments of the particular path are of different probe types.

6. The method as in claim 5, wherein the different probe types comprise Hypertext Transfer Protocol (HTTP) probes and Bidirectional Forwarding Detection (BFD) probes.

7. The method as in claim 1, further comprising:
    adjusting a frequency of one or more probes of the set of probes that are not in the subset.

8. The method as in claim 1, wherein the online application is a software as a service (SaaS) application.

9. The method as in claim 1, wherein the performance metric for the particular path is approximated using probes whose segments along the particular path are overlapping.

10. The method as in claim 1, wherein the performance metric for the particular path is approximated using probes whose segments along the particular path are non-overlapping.

11. The method as in claim 10, wherein the performance metric for the particular path is approximated using probes whose segments along the particular path are non-contiguous.

12. An apparatus, comprising:
    one or more network interfaces;
    a processor coupled to the one or more network interfaces and configured to execute one or more processes; and
    a memory configured to store a process that is executable by the processor, the process when executed configured to:
        identify a set of probes configured between a first endpoint and a second endpoint in a network, the second endpoint serving an online application, wherein each probe in the set of probes has one or more characteristics and is associated with a different segment between the first endpoint and the second endpoint;
        select a subset of the set of probes whose associated segments are along a plurality of paths between the first endpoint and the second endpoint, based on a match between the online application and the one or more characteristics of probes in the set of probes;
        approximate a performance metric for each of the plurality of paths by aggregating performance metrics measured by probes in the subset of probes that are associated with segments of that path; and
        cause traffic to be routed between the first endpoint and the second endpoint via a particular path in the plurality of paths, based on the performance metric of the particular path.

13. The apparatus as in claim 12, wherein the network is a software-defined network and the plurality of paths comprise network tunnels.

14. The apparatus as in claim 12, wherein the performance metric comprises loss, latency, jitter, or bandwidth.

15. The apparatus as in claim 12, wherein the one or more characteristics of each probe comprises a packet size, and wherein the apparatus selects the subset of the set of probes by:
    matching the packet size of each probe in the subset to an expected packet size of the traffic to be routed.

16. The apparatus as in claim 12, wherein the one or more characteristics of each probe comprises a probe type, and wherein at least two of the probes associated with segments of the particular path are of different probe types.

17. The apparatus as in claim 16, wherein the different probe types comprise Hypertext Transfer Protocol (HTTP) probes and Bidirectional Forwarding Detection (BFD) probes.

18. The apparatus as in claim 12, wherein the process when executed is further configured to:

adjust a frequency of one or more probes of the set of probes that are not in the subset.

19. The method as in claim 1, wherein the performance metric for the particular path is approximated using probes in the subset whose segments along the particular path are overlapping or non-contiguous.

20. A tangible, non-transitory, computer-readable medium storing program instructions that cause a device to execute a process comprising:

identifying, by the device, a set of probes configured between a first endpoint and a second endpoint in a network, the second endpoint serving an online application, wherein each probe in the set of probes has one or more characteristics and is associated with a different segment between the first endpoint and the second endpoint;

selecting, by the device, a subset of the set of probes whose associated segments are along a plurality of paths between the first endpoint and the second endpoint, based on a match between the online application and the one or more characteristics of probes in the set of probes;

approximating, by the device, a performance metric for each of the plurality of paths by aggregating performance metrics measured by probes in the subset of probes that are associated with segments of that path; and causing, by the device, traffic to be routed between the first endpoint and the second endpoint via a particular path in the plurality of paths, based on the performance metric of the particular path.

* * * * *

UNITED STATES PATENT AND TRADEMARK OFFICE
CERTIFICATE OF CORRECTION

| | |
|---|---|
| PATENT NO. | : 11,528,218 B2 |
| APPLICATION NO. | : 17/188287 |
| DATED | : December 13, 2022 |
| INVENTOR(S) | : Vinay Kumar Kolar |

It is certified that error appears in the above-identified patent and that said Letters Patent is hereby corrected as shown below:

In the Specification

Column 1, Line 22, please amend as shown:
that are measured from well-known locations (e.g., public clouds Column 1, Line 35, please amend as shown:
application and its estimated QoS from probing.

Column 9, Line 37, please amend as shown:
QoE by sending Hyper Text Transfer Protocol (HTTP) probes Column 9, Line 49, please amend as shown:
proportion of them could be avoided (e.g., using an alternate Column 11, Line 13, please amend as shown:
the second endpoint serving an online application. Each Column 12, Line 37, please amend as shown:
ming interface (API) or the like.

Column 12, Line 42, please amend as shown:
or type (e.g., HTTP ping, BFD probe, etc.), probe packet size, Column 12, Line 44, please amend as shown:
moment used to report the KPI etc. which can be registered Column 12, Line 45, please amend as shown:
to 602. An example probe entry in probe catalog 602 may be Signed and Sealed this
Third Day of September, 2024

Katherine Kelly Vidal
*Director of the United States Patent and Trademark Office*

CERTIFICATE OF CORRECTION (continued)
U.S. Pat. No. 11,528,218 B2

Column 14, Line 67, please amend as shown:
of probes (e.g., edges of the segment graph) that satisfy the above Column 15, Line 23, please amend as shown:
shortest path between the endpoints. CSI 606 may also Column 15, Line 30, please amend as shown:
shortest path (according to some QoS metric) at the given Column 15, Line 39, please amend as shown:
2, then loss over combined Segment1-Segment2 is at least Column 17, Line 6, please amend as shown:
application server. Under such conditions, BFD probes are Column 18, Line 22, please amend as shown:
the source node N1 and N2, Segment 2 extending between the Column 18, Line 31, please amend as shown:
Segment 1 and Segment 2,1. Hence, most derivations can be Column 19, Line 25, please amend as shown:
into a secondary segment graph. By doing so, CSI 606

Column 19, Line 32, please amend as shown:
if it finds that the probes were not used in primary or